United States Patent Office 3,526,606
Patented Sept. 1, 1970

3,526,606
COMPOSITIONS COMPRISING A BLOCK COPOLYMER, RUBBER AND A PROCESS OIL
Saburo Minekawa, Yokohama-shi, Koretaka Yamaguchi, Kawasaki-shi, and Kazuo Toyomoto and Einosuke Fujimoto, Yokohama-shi, Japan, assignors to Asahi Kasei Kogyo Kabushiki Kaisha, Kita-ku, Osaka, Japan
No Drawing. Filed Nov. 14, 1967, Ser. No. 683,025
Claims priority, application Japan, Nov. 24, 1966, 41/76,712
Int. Cl. C08c 9/04, 11/22; C08d 13/22
U.S. Cl. 260—5
3 Claims

ABSTRACT OF THE DISCLOSURE

A rubber composition consisting of 100 parts by weight of a rubber material containing at least 5% by weight of a butadiene/styrene copolymeric rubber having a styrene content of 60–95% by weight and having a butadiene bonding pattern including 20–50% of cis-1,4-linkage and less than 40% of 1,2-linkage, said copolymeric rubber being obtained by polymerization using a lithium based catalyst, 2–100 parts by weight of a process oil and 10–400 parts by weight of a filler.

BACKGROUND OF THE INVENTION

Field of the Invention

This invention relates to a composition of butadiene/styrene copolymeric rubber.

More particularly, it relates to a rubber composition comprising a rubber material containing at least 5% by weight of butadiene/styrene copolymeric rubber having a styrene content of 60–95% by weight and having a butadiene bonding pattern including 20–50% of cis-1,4-linkage and less than 40% of 1,2-linkage, which is obtained by copolymerization in the presence of a lithium based catalyst.

Description of prior art

The advent of polybutadiene rubber produced by the solution polymerization using a Zieglar-type or a lithium based catalyst in relatively recent years has given a revolutionary influence on the manufacturers of rubber goods which have relied chiefly upon natural rubber and butadiene/styrene copolymeric rubber obtained by emulsion polymerization, which may be referred to as "emulsion-polymerized butadiene/styrene copolymeric rubber" hereinafter.

This is due to the fact that it has been clarified that the polybutadiene rubber obtained by solution polymerization has a higher degree of 1,4-linkage, while having less branching and containing less low molecular weight polymer which adversely affect the performance of the rubber, as compared with the natural rubber or the emulsion-polymerized butadiene/styrene copolymeric rubber or polybutadiene rubber used heretofore, thus; it exhibits an excellent performance, more specifically, abrasion resistance, dynamic property, and low temperature characteristic, which are not expected from general purpose rubbers known heretofore.

Thus, the polybutadiene rubber obtained by solution polymerization has been used for practically all rubber goods such as tyre treads, carcass, belts, industrial goods, cloth-inserted rubber sheets, rubber sponge, foamed rubber goods, etc., because of its excellent performance.

Furthermore, there has been developed a butadiene/styrene copolymeric rubber obtained by polymerization using a lithium based catalyst in an attempt to preserve the excellent performance of the polybutadiene rubber obtained by solution polymerization and further to improve drawbacks found in such polybutadiene rubber in the processability such as the roll banding property, the extrusion property and the calendering characteristic.

The lithium based catalyst is one of the few practical catalysts capable of copolymerizing 1,3-butadiene and styrene in the solution polymerization, and one of the important features of the lithium based catalyst used in the copolymerization of 1,3-butadiene and styrene resides in that it affords various copolymeric rubbers having an optional bonding pattern and showing an extremely characteristic performance, such as random or block copolymeric rubbers by suitably adjusting the polymerization system.

For example, a butadiene/styrene random copolymeric rubber having a styrene content of 18.0% by weight which is produced by using the lithium based catalyst has an abrasion resistance and a dynamic property equal to those of solution polymerized polybutadiene rubber, and further has a remarkably excellent slipping resistance on a wet road surface, thus, it exhibits an optimum performance as a compound for tyre treads. On the other hand, a butadiene/styrene block copolymeric rubber having a styrene content of 23.0% by weight has an excellent extrusion property, particularly an excellent appearance of extrudate surface, as compared with that of random copolymeric rubber or emulsion-polymerized butadiene/styrene copolymeric rubber having the same styrene content, thus, it is suitably used for the production of various extruded products such as electric wire coating material and weatherstrip for automobile.

As described above, since the bonding pattern in the butadiene/styrene copolymeric rubber obtained by using the lithium based catalyst can be varied optionally, there can be produced from such butadiene/styrene copolymeric rubber a wide variety of products having a multiplicity of properties in the performance of which are not found in emulsion-polymerized butadiene/styrene copolymeric rubbers known heretofore. However, the styrene content in the butadiene/styrene copolymeric rubber produced heretofore has been less than 60% by weight without exception.

In the past, there has been produced the emulsion-polymerized butadiene/styrene copolymer as a synthetic rubber having a styrene content of more than 60% by weight. However, such emulsion-polymerized butadiene/styrene copolymeric rubber has been chiefly used for a compound for hard rubber soles or a compound for sponge foam rubber soles as in the case of, for example, a butadiene/styrene copolymeric rubber having a styrene content of about 60%, which is, more particularly, a mixture consisting of a butadiene/styrene copolymeric rubber having a styrene content of 85% by weight and a butadiene/styrene copolymeric rubber having a styrene content of 23.5% by weight.

This has been mainly due to the fact that the vulcanized rubber product obtained from a compound containing the emulsion-polymerized butadiene/styrene copolymeric rubber having a high styrene content exhibits a high hardness and abrasion resistance suitable for rubber soles.

However, the emulsion-polymerized butadiene-/styrene copolymeric rubber having a high styrene content has disadvantages in that the dynamic properties are quite poor due to the very high styrene content and that the performance is rapidly deteriorated when a large amount of filler is incorporated thereinto. Furthermore, one of the greatest drawbacks found in the emulsion-polymerized butadiene/styrene copolymeric rubber having a high styrene content is that the anticold property, i.e. the low temperature characteristic is very poor. Thus, because of the poor low temperature characteristic, the sole of footwear using such copolymeric rubber compound becomes extraordinary hard in cold-weathered places and the manufacture of high quality footwears has often been impossible.

SUMMARY OF THE INVENTION

Accordingly, the object of this invention resides in the provision of a synthetic rubber composition having an improved processability in an open roll or a Banbury mixer which may be suitably used for the production of hard rubber soles of footwears and hard extruded products.

Another object of this invention resides in the provision of a synthetic rubber composition suitably used for the production of various hard vulcanized products having excellent abrasion resistance, dynamic properties and low temperature characteristic.

Still another object of this invention resides in the provision of a synthetic rubber composition having excellent foaming efficiency and processability which enable the production of various hard foamed products.

Further, still another object of this invention is to provide a synthetic rubber composition suitably used for the production of various vulcanized products having a high hardness as well as an improved permanent compression set.

Among the objects of this invention mentioned above, the production of hard vulcanized products having an improved processability and an excellent performance, and hard foamed products having excellent foaming efficiency and processability can be accomplished by using a rubber composition consisting of 100 parts by weight of a rubber material containing at least 5% by weight of butadiene/styrene copolymeric rubber having a styrene content of 60–95% by weight and having a butadiene bonding pattern including 20–50% of cis-1,4-linkage and less than 40% of 1,2-linkage which is obtained by polymerization using a lithium based catalyst, 2–100 parts by weight of a process oil and 10–400 parts by weight of a filler.

The production of vulcanized rubber products in which a high hardness is particularly required, which is another object of this invention, can be accomplished by using a synthetic rubber composition consisting of 100 parts by weight of a rubber material containing at least 5% by weight of butadiene/styrene copolymeric rubber having a styrene content of 60–95% by weight, and a block styrene content of 5–90% by weight and having the same butadiene bonding pattern as mentioned above which is obtained by polymerization using a lithium based catalyst, a process oil and a filler, amounts of which are in the range specified above.

Moreover, the production of hard vulcanized rubber products having a high hardness and a good permanent compression set, which is still another object of this invention, can be accomplished by using a synthetic rubber composition consisting of 100 parts by weight of a rubber material containing at least 5% by weight of butadiene/styrene block copolymeric rubber obtained by polymerization using a lithium based catalyst and having a structure of the formula $$B_1-A-B_2$$

wherein $B_1$ and $B_2$ represent a polybutadiene or a 1,3-butadiene/styrene random copolymeric block having a styrene content of less than 50% by weight, A represents a polystyrene block, the composition ratio of $B_1$ and $B_2$ blocks being respectively 5–90% by weight based on the total weight of said block copolymer and the composition ratio of A block being 5–75% by weight on the same basis, 2–100 parts by weight of a process oil and 5–400 parts by weight of a filler.

We have found that the butadiene/styrene copolymeric rubber having a styrene content of 60–95% by weight obtained by polymerization using the lithium based catalyst has superior dynamic properties and a low temperature characteristic to those of emulsion-polymerized butadiene/styrene copolymeric rubber having a high styrene content known heretofore and that the performance of the present butadiene/styrene copolymeric rubber may not be degraded even when a large amount of compounding agents is incorporated thereinto.

Further, it has been found that the butadiene/styrene copolymeric rubber having a styrene content of 60–95% by weight obtained by the polymerization using a lithium based catalyst exhibits a remarkably excellent property in the abrasion resistance as compared with the emulsion-polymerized butadiene/styrene copolymeric rubber having a high styrene content.

The superiority of the butadiene/styrene copolymeric rubber having a styrene content of 60–95% by weight obtained by polymerization using the lithium based catalyst over the emulsion-polymerized butadiene/styrene copolymeric rubber having a high styrene content known heretofore resides in the fact that when a compound containing the present butadiene/styrene copolymeric rubber obtained by polymerization using the lithium based catalyst is milled in an open roll, the shinkage of the commounded blank, i.e. a mill-shrinkage, is remarkably small, since the present butadiene/styrene copolymeric rubber essentially has a low degree of branching.

The small shrinkage of the compound after removal from the roll mill is a particularly important point in calendering the milled compound and this implies that the dimension of the compounded stock is stabilized and that a product having an excellent processability and uniformity in quality can be manufactured.

Furthermore, the butadiene/styrene copolymeric rubber having a styrene content of 60–95% by weight obtained by the polymerization using the lithium based catalyst is excellent in the extrusion property, particularly the extrusion rate and the extrudate surface, as compared with the emulsion-polymerized butadiene/styrene copolymeric rubber, and the production of various rubber products having an extremely smooth extruded surface can now be accomplished.

In addition, when the butadiene/styrene copolymeric rubber having a styrene content of 60–95% by weight obtained by polymerization using the lithium based catalyst is used for the production of sponge foamed rubber products, it affords a product having a far higher foaming efficiency and uniform foams as compared with the emulsion-polymerized butadiene/styrene copolymeric rubber having a high styrene content known heretofore, since the present butadiene/styrene copolymeric rubber contains a large amount of styrene which shows flow tendency at a high temperature, and practically no branching in the molecule, and it has a relatively narrower molecular weight distribution.

As described above, the butadiene/styrene copolymeric rubber having a styrene content of 60–95% by weight obtained by polymerization using the lithium based catalyst exhibits an excellent performance even when it is used alone, however, its desirable properties are most advantageously utilized from the standpoint of performance of the vulcanized products to be obtained therefrom, when it is used in combination with natural rubber or other synthetic rubbers.

The synthetic rubbers which may be suitably used in combination with the butadiene/styrene copolymeric rubber having a styrene content of 60–95% by weight obtained by copolymerization using the lithium based catalyst include, for example, emulsion-polymerized butadiene/styrene copolymeric rubber, emulsion- or solution-polymerized polybutadiene rubber, solution-polymerized butadiene/styrene copolymeric rubber having a low styrene content and polyisoprene rubber.

The solution-polymerized polybutadiene rubbers which may be used in the composition of this invention include those having more than 90% of cis-1,4-linkage which are obtained by polymerization using a combination catalyst, such as triisobutylaluminum/titanium tetraiodide, triethylaluminum/titanium tetraiodide, tributylaluminum/titanium tetrachloride/titanium tetraiodide, triethylaluminum/titanium tetrachloride/iodine, diethylaluminum chloride/cobalt chloride, triethylaluminum/vanadium oxychloride and triethylaluminum/boron trifluoride/nickel naphthenate; those having a relatively low cis-linkage obtained by polymerization using a lithium catalyst; and those obtained by polymerization using an alfine catalyst comprising a combination of, for example, sodium chloride/allylsodium/sodium isopropoxide.

The solution-polymerized butadiene/styrene copolymeric rubbers having a low styrene content which may be used in the composition of this invention include butadiene/styrene random or block copolymeric rubber having a styrene content of less than 60% by weight and a butadiene bonding pattern including 20–50% of cis-1,4-linkage and less than 40% of 1,2-linkage obtained by polymerization using a lithium catalyst, and butadiene/styrene random copolymeric rubbers obtained by polymerization using an alfine catalyst.

The polyisoprene rubbers which may be used in the composition of this invention in combination with the butadiene/styrene copolymeric rubber having a styrene content of 60–95% by weight obtained by polymerization using the lithium based catalyst include, for example, cis-polyisoprene rubbers obtained by polymerization using a combination catalyst consisting of triethlaluminum and titanium tetrachloride, or, a lithium based catalyst.

In the composition of this invention, other synthetic rubbers than mentioned above, such as an emulsion-polymerized butadiene/acrylonitrile copolymeric rubber, polychloroprene rubber or ethylene/propylene copolymeric rubber, may be incorporated for the particular purpose of improving the oil-resistance, weathering resistance, etc.

In the composition of this invention, the natural rubber or other synthetic rubbers may be blended with the butadiene/styrene copolymeric rubber having a styrene content of 60–95% by weight obtained by polymerization using the lithium based catalyst either alone or in a combination of two or more kinds. However, it is preferable that the butadiene/styrene copolymeric rubber having a styrene content of 60–95% by weight obtained by polymerization using the lithium based catalyst is contained in an amount of at least 5% by weight in the rubber material in order to fully utilize its excellent processability and performance.

In preparing the composition of this invention, the butadiene/styrene copolymeric rubber having a styrene content of 60–95% by weight obtained by the polymerization using the lithium based catalyst and other synthetic rubbers to be mixed therewith may be milled in a Bunbury mixer or on an open roll together with the compounding agents such as fillers and process oil. Alternatively, they may be mixed in the form of solutions of aliphatic or aromatic hydrocarbons beforehand, and used as a blended rubber after removing the solvent from the mixture and drying the residue.

As described above, when a small amount of butadiene/styrene copolymeric rubber having a styrene content of 60–95% by weight obtained by polymerization using the lithium based catalyst is blended with the natural rubber and/or other synthetic rubber, the effect of improvements in the processability and the performance of the resulting compound is far greater than that attainable with a butadiene/styrene copolymeric rubber obtained by polymerization using a lithium based catalyst having a lower styrene content than specified in the present invention, not to mention the emulsion-polymerized butadiene/styrene copolymeric rubber having a high styrene content.

The polymerization catalysts which may be preferably used for producing the butadiene/styrene copolymeric rubber used in the composition of this invention include, for example, metallic lithium, methyllithium, ethyllithium, propyllithium, butyllithium, amyllithium, hexyllithium, 2-ethylhexyllithium, phenyllithium, various types of tolyllithium, methylene dilithium, ethylene dilithium, trimethylene dilithium, pentamethylene dilithium, 1,4-dilithiobenzene, 1,5-dilithionaphthalene and 1,2-dilithiostilbene.

It is noted that an addition of a compound having polar groups such as tetrahydrofurane to the lithium based catalyst used in the production of butadiene/styrene copolymeric rubber leads to a slight change in the bonding pattern of butadiene, i.e. 1,2-linkage is increased while cis-1,4-linkage is decreased.

Such butadiene/styrene copolymeric rubber having a styrene content of 60–95% and having a butadiene bonding pattern in which 1,2-linkage is increased exhibits a partially improved processability such as the compatibility and extrusion characteristic, although the abrasion resistance and dynamic property are somewhat deteriorated as compared with a butadiene/styrene copolymeric rubber produced in the absence of the additives.

The butadiene/styrene copolymeric rubber is essentially required to have a butadiene bonding pattern including less than 40% of 1,2-linkage and 20–50% of cis-1,4-linkage in order to show a sufficient performance and further show a satisfactory processability and physical properties when mixed with the natural rubber and/or other synthetic rubber.

The additives having polar groups which may be used to increase the amount of vinyl group in the butadiene bonding pattern, i.e. 1,2-linkage, of the butadiene/styrene copolymeric rubber having a styrene content of 60–95% by weight used in the composition of this invention preferably include dimethyl ether, methylethyl ether, diethyl ether, dimethoxydiethyl ether, tetrahydrofurane, 1,3-dioxane, diethyl thioether, dibutyl thioether, pyridine, triethylamine, polyethylene oxide, polypropylene oxide, polytetramethylene oxide and hexamethylphosphoramide. These additives exemplified above should be used in a suitable amount so that the butadiene bonding pattern of the polybutadiene rubber or butadiene/styrene copolymeric rubber may have less than 40% of 1,2-linkage.

As stated hereinbefore, in copolymerizing 1,3-butadiene with styrene using a lithium based catalyst, there can be obtained various copolymeric rubbers in which 1,3-butadiene and styrene may take any optional bonding pattern, i.e. various copolymeric rubbers having any desired block styrene content, for example, from a perfect butadiene/styrene block copolymeric rubber to a perfect random copolymeric rubber, by suitably choosing the polymerization method. In the composition of this invention, therefore, copolymeric rubbers having an optional block styrene content, i.e. from a perfect block copolymeric rubber to a perfect random copolymeric rubber, may be used as the butadiene/styrene copolymeric rubber having a styrene content of 60–95%, which is an essential component in the composition of this invention.

Generally speaking, when the amount of block styrene is increased in the butadiene/styrene copolymeric rubber, the abrasion resistance and hardness of the rubber product obtained therefrom are increased and the processability, particularly the extrusion property thereof is further improved, though the dynamic property and tensile properties are somewhat degraded on the other hand. Thus, when using the butadiene/styrene copolymeric rubber having a styrene content of 60–95% by weight as a compound for rubber sole, for example, it is necessary to select a copolymeric rubber having a suitable block styrene content in order to attain a well-balanced performance from the standpoints of the abrasion resistance and hardness. That is, the block styrene content of the butadiene/styrene copolymeric rubber having a styrene content of 60–95% by weight obtained by the polymerization using the lithium based catalyst should be decided depending upon the type of product to be produced therefrom.

In general, when the butadiene/styrene copolymeric rubber having a styrene content of 60–95% by weight is used for the purpose of improving the abrasion resistance and hardness, it is necessary that such copolymeric rubber has a block styrene content of more than 5% by weight.

The possibility of changing the physical properties of copolymeric rubber by suitably adjusting the bonding pattern of styrene contained therein depending upon the use of product to be produced therefrom as mentioned above is a great feature of the polymerization using a lithium based catalyst. Thus, by the adoption of such polymerization method, the use of the butadiene/styrene copolymeric rubber has been remarkably expanded.

Although it has been known well heretofore that as the amount of block styrene contained in the butadiene/styrene copolymeric rubber which is used as a material rubber in the present invention increases, the hardness of vulcanized rubber product obtained therefrom increases, there is a disadvantage in that the permanent compression set of the vulcanized rubber product is deteriorated on the other hand.

We have found that the vulcanized rubber products having a high hardness and a good permanent compression set can be produced from a rubber composition using as a material rubber a so-called 3-block copolymeric rubber having the structure of the general formula:

wherein $B_1$ and $B_2$ represent polybutadiene or butadiene/styrene random copolymeric block, and A represents polystyrene block.

The above-mentioned 3-block copolymeric rubber has the structure in which a styrene block is positioned at the center of which both sides are secured by the rubbery blocks. Thus, said copolymeric rubber has advantages in that it exhibits not only a food permanent compression set but also an excellent abrasion resistance, and further that it shows a small degree of degradation in the physical properties even at a high temperature and there can be obtained a vulcanized rubber product having an excellent performance.

Now, the block copolymeric rubber which may be used in the composition of this invention has the structure of the general formula $B_1$—A—$B_2$ as stated above. Of these segments, $B_1$ and $B_2$ are polybutadiene or 1,3-butadiene/styrene random copolymeric block and these block segments essentially show a rubbery elasticity after the vulcanization. Accordingly, the styrene content in either $B_1$ or $B_2$ segment must be less than 50% in each segment.

If the styrene content exceeds 50%, the resulting vulcanized product does not show the performance characterized by this invention but shows inferior dynamic property and roll mill processability.

The composition ratio of $B_1$ or $B_2$ block based on the total block polymer should essentially be in the range of 5–90% and if the proportion of either one of these blocks, $B_1$ or $B_2$, deviates from the range specified above, the resulting vulcanized product does not show the processability and performance characterized by this invention but shows inferior processability and abrasion resistance.

The styrene block A which is positioned at the center of the 3-block copolymeric rubber is a block segment having a plastic physical property and the composition ratio of the block A based on the total block copolymer should essentially be in the range of 5–75%. If the proportion of block A is less than 5%, the performance characterized by this invention such as the excellent processability and hardness may not be obtained, while the proportion exceeding 75% leads to an extraordinarily high hardness of the resulting vulcanized product and the characteristic of the 3-block copolymeric rubber such as the good permanent compression set may not be necessarily fully manifested.

In the butadiene/styrene copolymeric rubber having a styrene content of 60–95% by weight obtained by polymerization using the lithium based catalyst which may be used in the composition of this invention, a small amount of a suitable cross-linking agent such as dialkenyl aromatic hydrocarbon, silicon tetrachloride or tetravinyl silicon may be contained in order to avoid the inconveniences encountered in the practical production of the present butadiene/styrene copolymeric rubber, for example, the flow property at a relatively high temperature and the excessive tackiness to the roll surface when it is milled on an open roll at a relatively high temperature.

These cross-linking agents as exemplified above may be added in a suitable amount at any desired stage in the course of the polymerization reaction.

The styrene content of the butadiene/styrene copolymeric rubber which is used in the composition of this invention is 60–95% by weight and most preferably 65–90% by weight. If the styrene content is less than 60% by weight, the greatest feature in the performance of the butadiene/styrene copolymeric rubber which is used in the composition of this invention, such as the abrasion resistance, hardness and extrusion property may not be fully exhibited, while, adversely, the styrene content exceeding 95% by weight leads to the deterioration in the dynamic property and abrasion resistance of the resulting rubber product and further to a remarkable degradation in the compatibility with natural rubber or other synthetic rubber and shows properties so inferior that it gives a product of no practical utility.

Generally speaking, when 1,3-butadiene is copolymerized with styrene in the presence of a lithium based catalyst, the rate of reaction of styrene is slower than that of 1,3-butadiene, thus, only a very small portion of styrene is randomly copolymerized and a great majority of styrene is homopolymerized to form a block styrene at the active terminals of 1,3-butadiene block after the 1,3-butadiene has been completely polymerized. Accordingly, in order to obtain a butadiene/styrene random copolymeric rubber, it is necessary to follow the procedures in which a monomeric mixture containing a large amount of styrene and a minor amount of 1,3-butadiene is first prepared, and 1,3-butadiene is supplemented thereafter either continuously or intermittently as the polymerization is proceeded in the presence of a lithium based catalyst, and as a result, a uniformly random copolymeric rubber of butadiene/styrene may be obtained at the time the copolymerization is nearly completed.

Alternatively, British Pat. No. 1,029,445 proposes a process for producing the butadiene/styrene random copolymeric rubber in the presence of a lithium based catalyst without supplementing 1,3-butadiene as observed in the above-mentioned procedures, which comprises adding a small amount of organo-alkali metal compound other than lithium compounds which may be represented by the general formulae:

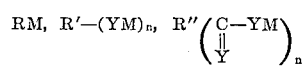

wherein R, R' and R" represent a radical selected from aliphatic hydrocarbons, aromatic hydrocarbons and cyclic saturated hydrocarbons, M represents an alkali metal other than lithium, Y represents oxygen or sulfur and $n$ is an integer of 1–3, to the lithium based catalyst.

Butadiene/styrene copolymeric rubber having a styrene content of 60–95% by weight and containing a block styrene content of more than 5% by weight may be obtained in general either by adjusting the mixing ratio of 1,3-butadiene and styrene which are charged at first or by adjusting the amount of 1,3-butadiene supplemented thereafter.

Furthermore, since the amount of block styrene contained in the copolymeric rubber is generally decreased with respect to the amount of styrene initially charged if the polymerization is carried out in the presence of a lithium based catalyst together with an additive having the polar group mentioned above, butadiene/styrene copolymeric rubber having desired amounts of block styrene and random styrene may also be obtained without supplementing 1,3-butadiene by adding the polar group-containing additive to the lithium based catalyst in such an amount that 1,2-linkage content in the butadiene portion may be less than 40%.

Alternatively, the block styrene may be formed by adding a suitable amount of styrene after 1,3-butadiene has been completely polymerized or, after 1,3-butadiene and styrene have been completely randomly copolymerized.

Now, the most conventional process for producing the 3-block copolymeric rubber of the above-mentioned general formula, $B_1$—A—$B_2$, by using the lithium based catalyst is that 1,3-butadiene is first polymerized in the presence of a mono-lithium compound or a metallic lithium, then, after the completion of the polymerization, styrene is additionally polymerized thereto and after the complete polymerization of the styrene, 1,3-butadiene is further added thereto to be completely polymerized.

In general, in the copolymerization of 1,3-butadiene and styrene by using the lithium based catalyst, the rate of reaction of 1,3-butadiene is much faster than that of styrene and thus a great majority of styrene is polymerized after 1,3-butadiene has been substantially polymerized. Therefore, 1,3-butadiene and styrene may be first copolymerized in the presence of the mono-lithium compound or metallic lithium and, after the 1,3-butadiene and styrene have been completely copolymerized, 1,3-butadiene may be additionally polymerized.

The 3-block copolymeric rubber may be obtained by any other polymerization methods using the lithium based catalyst.

As described above, the introduction of block styrene into the butadiene/styrene copolymeric rubber can be accomplished in many different ways. However, it must be decided upon consulting with the desired properties of the product for which the butadiene/styrene copolymeric rubber is intended to be used.

The butadiene/styrene copolymeric rubber having a styrene content of 60–95% by weight obtained by the polymerization using the lithium based catalyst may be used for various useful products by subjecting the same to a vulcanization either alone or in combination with natural rubber and/or other synthetic rubbers after being compounded with various compounding agents.

Among the various compounding agents conventionally used, the fillers are particularly important with regard to the performance of the vulcanized product.

These fillers may be generally classified into two groups, i.e. ones being mainly used for the purpose of improving the performance, particularly the abrasion resistance, hardness, etc., of the vulcanized products, and various carbon black and finely powdered anhydrous silicic acid having different particle diameters and surface structures are included in this category; others being mainly used as extenders or assistants for improving the processability of the vulcanized product, and calcium carbonate, calcium silicate, calcium carbonate coated with fatty acid, magnesium carbonate, magnesium oxide, zinc oxide, titanium oxide, clay, alumina, talc and the like are included in this category.

Upon actual use, of course, these fillers may be used in a suitable combination taking the purpose and economy into consideration.

The amount of a filler used is necessarily 10–400 parts by weight per 100 parts by weight of the material rubber used.

Although the amount of the filler used is suitably decided depending upon the use of the contemplated rubber product, an amount of less than 10 parts by weight is by no means sufficient from the standpoint of performance of almost any rubber products, while, an amount exceeding 400 parts by weight leads to a deterioration in the performance, particularly the abrasion resistance, of the rubber product.

In general, these fillers are mixed mechanically in a Banbury mixer or on an open roll. However, in a particular case, these fillers may be incorporated into the material rubber in the course of the production thereof before removing water or aliphatic or aromatic hydrocarbon solvent and used as a master batch of fillers obtained by removing water or solvent therefrom.

A compounding agent of importance other than the fillers mentioned before is a process oil. In general, a process oil used as a rubber compounding agent consists of high boiling components of a petroleum fraction and may be divided into various types according to the chemical structure of hydrocarbon molecules of the oil such as a paraffinic oil consisting of straight chain saturated hydrocarbons, a naphthenic oil consisting of saturated cyclic hydrocarbon and an aromatic oil consisting of unsaturated cyclic hydrocarbon and, normally, it is classified in accordance with its "Viscosity Gravity Constant," hereinafter referred to simply as "V.G.C.," given by the following equation:

$$V.G.C. = \frac{G - 0.24 - 0.022 \log(V - 35.5)}{0.755}$$

wherein G is a specific gravity of the oil at 60° F., and V is a viscosity of the oil at 210° F. indicated by Saybolt universal standard.

In general, the process oils are classified in such a manner that the one having a V.G.C. of 0.850–0.899 is a naphthenic oil and the one having a V.G.C. of more than 0.900 is an aromatic oil.

Although any process oils having a V.G.C. within the range of 0.790–1.00 may be used for the butadiene/styrene copolymeric rubber having a styrene content of 60–95% by weight used in the composition of this invention, it is preferable that a process oil having a relatively low V.G.C. value may be used in a somewhat smaller amount in order to increase the dispersibility and plasticity of the resulting compounded rubber, since such process oil has a poor compatibility with the butadiene/styrene copolymeric rubber.

Adversely, a process oil having a greater V.G.C. value may be used in a large amount for the purpose of improving the plasticity and dispersibility of the resulting compounded rubber as well as reducing the cost.

The amount of process oil used in the composition of this invention is 2–100 parts by weight, preferably 5–75 parts by weight per 100 parts by weight of the material rubber. If the amount of process oil is less than 2 parts by weight, the dispersion of the filler and vulcanization accelerator may not be achieved satisfactorily, while an amount exceeding 100 parts by weight leads to deterioration in the physical property of the resulting vulcanized rubber product.

The process oil which may be used in the composition of this invention can be mixed mechanically in a Banbury mixer or on an open roll together with other additives. Alternatively, the process oil may be used in the form of an oil extended polymer which is obtained by mixing the whole or a part of the process oil to be blended with the butadiene/styrene copolymeric rubber having a styrene content of 60–95% by weight used in the composition or with other synthetic rubbers to be used in combination therewith, such as emulsion-polymerized butadiene/styrene copolymeric rubber, solution-polymerized polybutadiene rubber, emulsion-polymerized polybutadiene rubber or polyisoprene rubber in the form of a latex or a solution in aliphatic or aromatic hydrocarbons, and removing the solvent thereafter to give the oil extended polymer.

In general, in order to obtain a composition containing a large amount of the process oil, it is desirable to blend the process oil into the rubber in the form of the oil extended polymer from the standpoints of the processing operation and the performance of the resulting product.

Besides the fillers and process oils mentioned above, there are other compounding agents generally used in a rubber composition, for example, tackifiers derived from rosin acid, coumarone resin or petroleum resin, vulcanization accelerators, vulcanizer such as sulfur or peroxides, processing assistants such as stearic acid or metal salts thereof, antioxidant or an agent preventing deterioration by ozone, wax, etc. These compounding agents are compounded in suitable amounts depending upon the contemplated use of the product.

The rubber composition thus obtained comprising the material rubber containing the butadiene/styrene copolymeric rubber having a styrene content of 60–95% by weight and having a butadiene bonding pattern including 20–50% of cis-1,4-linkage and less than 40% of 1,2-linkage obtained by the polymerization using the lithium based catalyst has superior performance and properties over the conventional composition known heretofore comprising emulsion-polymerized butadiene/styrene copolymeric rubber having a high styrene content with respects to the extrusion property and mill shrinkage property, and, further, when used for sponge foam products, the processability such as foaming property, abrasion resistance, dynamic property and low temperature characteristic. Thus, the rubber composition of this invention can be used for purposes for which the use of the conventional emulsion-polymerized butadiene/styrene copolymeric rubber having a high styrene content has not been suitable hitherto, not to mention the purposes for which the conventional composition has been successfully used heretofore.

Furthermore, the production of the rubber products showing excellent performance hardly expected from the conventionally known rubber composition comprising emulsion-polymerized butadiene/styrene copolymeric rubber having a high styrene content can now be accomplished due to the fact that the processability such as extrusion property and the performance such as abrasion resistance of the butadiene/styrene copolymeric rubber having a styrene content of 60–95% by weight obtained by the polymerization using the lithium based catalyst can be further improved by making the block styrene content therein more than 5% by weight.

As described above, the butadiene/styrene copolymeric rubber having a styrene content of 60–95% by weight obtained by the polymerization using the lithium based catalyst which may be used in the composition of this invention may be substituted for the conventional emulsion-polymerized butadiene/styrene copolymeric rubber known heretofore and bring about an improvement in the processability of the resulting compounded rubber by adding a small amount thereof. Therefore, the copolymeric rubber has really great importance and significance in commerce.

Moreover, the rubber composition comprising the material rubber containing so-called 3-block copolymeric rubber having a particular structure in which polystyrene block is positioned at the center and polybutadiene blocks or butadiene/styrene random copolymeric blocks are positioned at both sides of said polystyrene block enables the production of various vulcanized rubber products having a number of excellent performances such as a high hardness and a superior permanent compression set, which are brought about by the unique structure of the above-mentioned 3-block copolymeric rubber and which have not been found in the conventional synthetic rubbers known heretofore.

DESCRIPTION OF THE PREFERRED EMBODIMENTS

This invention will be explained more fully in the following examples. It should not be construed, however, that these examples restrict this invention as they are given merely by way of illustration:

Example 1

In general, in order to obtain a butadiene/styrene random copolymeric rubber using a lithium based catalyst, the styrene content in the monomeric mixture of 1,3-butadiene and styrene to be polymerized first should be made higher since the rate of reaction of 1,3-butadiene is higher than that of styrene when these monomers are present together. For example, when polymerizing a monomeric mixture consisting of 4.8 parts by weight of 1,3-butadiene and 95.2 parts by weight of styrene in n-hexane in the presence of n-butyllithium, the proportion of 1,3-butadiene to styrene polymerized at the initial stage is 40:60 in a weight ratio. Thus, in order to keep the composition ratio of 1,3-butadiene to styrene at the above-mentioned ratio in the resulting copolymeric rubber, 1,3-butadiene is further supplemented continuously into the polymerization solution so as to produce a random copolymeric rubber having uniform styrene content throughout the initial stage to the terminal stage of the polymerization reaction.

A butadiene/styrene random copolymeric rubber (A) having a styrene content of 65.5% by weight was obtained according to the procedures mentioned above. The polymerization conditions and the major physical properties of the resulting butadiene/styrene random copolymeric rubber are shown in Table 1.

The above-mentioned copolymeric rubber (A) contained 1.0 part by weight of phenyl-β-naphthylamine per 100 parts by weight of the copolymeric rubber.

TABLE 1

| Polymerization conditions: | Parts by wt. |
|---|---|
| Amount of 1,3-butadiene initially charged | 3 |
| Amount of styrene initially charged | 65 |
| Amount of 1,3-butadiene supplemented later | 32 |
| Amount of n-butyl lithium | 0.070 |
| Amount of n-hexane | 400 |
| Amount of bound styrene (wt. percent)[1] | 65.5 |
| Amount of block styrene (wt. percent)[2] | 1.0 |
| Butadiene bonding pattern: [3] | |
| Cis-1,4-linkage (percent) | 34.5 |
| Trans-1,4-linkage (percent) | 54.0 |
| 1,2-linkage (percent) | 11.5 |

[1] Measured by Abbe refractometer.
[2] Amount of block styrene was determined by the following method:
First, 2 parts by weight of the butadiene/styrene copolymeric rubber (A) was dissolved in 100 parts by weight of carbon tetrachloride and to the resulting solution was added 5 parts by weight of di-tertiary-butyl-hydroperoxide and further 0.01 part by weight of osmium tetroxide, and the resulting mixture was heated at 80° C. for 15 minutes so as to destroy and decompose completely the double bond present in the molecules of the butadiene/styrene copolymeric rubber. To the resulting solution was added a large amount of methanol to precipitate block styrene. The precipitate was filtered off and dried in vacuo to weigh the amount of block styrene and the amount was calculated in terms of weight percent based on the butadiene/styrene copolymeric rubber.
[3] Determined according to Morelo's method using an infrared spectrometer.

Further, there was obtained a butadiene/styrene block copolymeric rubber (B) having a styrene content of 65% by weight in n-hexane using n-butyl lithium as a catalyst.

As can be noted from Table 2 showing the polymerization conditions, styrene was charged and polymerized after the total amount of 1,3-butadiene was completely polymerized. The major properties of the resulting butadiene/styrene block copolymer are given in Table 2 as well.

TABLE 2

| Polymerization conditions: | Parts by wt. |
|---|---|
| Amount of 1,3-butadiene | 35 |
| Amount of styrene | 65 |
| Amount of n-butyl lithium | 0.070 |
| Amount of n-hexane | 400 |
| Amount of bound styrene (wt. percent) | 65.0 |
| Amount of block styrene (wt. percent) | 64.5 |
| Butadiene bonding pattern: | |
| Cis-1,4-linkage (percent) | 34.5 |
| Trans-1,4-linkage (percent) | 53.0 |
| 1,2-linkage (percent) | 12.5 |

These two butadiene/styrene copolymeric rubbers (A) and (B) thus obtained in the instant example and a commercially available emulsion-polymerized butadiene/styrene copolymeric rubber (C) having a styrene content of 62% by weight, more particularly, Hycar–2057S (trade name) which is a mixture of an emulsion-polymerized butadiene/styrene copolymeric rubber having a styrene content of 85% by weight and an emulsion-polymerized butadiene/styrene copolymeric rubber having a styrene content of 23.5% by weight, were compounded according to the recipe given in Table 3 and milled in a B-type Banbury mixer, respectively:

TABLE 3

Recipe

| | Part(s) by wt. |
|---|---|
| Butadiene/styrene copolymeric rubber | 100 |
| H.A.F. grade carbon black | 50 |
| Aromatic process oil [1] | 10 |
| Stearic acid | 1.0 |
| Zinc oxide | 3.0 |
| Antioxidant D [2] | 1.0 |
| Vulcanization accelerator CZ [3] | 1.0 |
| Sulfur | 1.8 |

[1] A process oil having a V.G.C. of 0.9233 and a specific gravity of 0.9857.
[2] Trade name of phenyl-$\beta$-naphthylamine.
[3] Trade name of n-cyclohexylbenzothiazyl sulphenamide.

The mixing conditions were such that all of the compounding agents except for the vulcanization accelerator CZ and sulfur were mixed at 120° C. for 6 minutes and after the resulting mixture was aged for 24 hours, there were mixed the vulcanization accelerator CZ and sulfur at 105° C. for 2 minutes.

The Mooney viscosities of these three different butadiene/styrene copolymeric rubber compounded products thus prepared are shown in the following Table 4:

TABLE 4

| | Mooney viscosity [1] ($ML_{1+4}$) |
|---|---|
| Example butadiene/styrene copolymeric rubber (A) compounded product | 75.0 |
| Example butadiene/styrene copolymeric rubber (B) compounded product | 85.0 |
| Comparative Example emulsion-polymerized butadiene/styrene copolymeric rubber (C) compounded product | 70.0 |

[1] Measured by using a Mooney viscosimeter. The values given are indications of the meter after rotating a big rotor for 4 minutes with a preheating at 100° C. for 1 minute.

Now, these three different butadiene/styrene copolymeric rubber compounded products were milled on an open mill at 80° C. and the mill shrinkage was measured. The results are shown in Table 5:

TABLE 5

| | Mill shrinkage (percent) [1] |
|---|---|
| Example butadiene/styrene copolymeric rubber (A) compounded product | 20 |
| Example butadiene/styrene copolymeric rubber (B) compounded product | 15 |
| Comparative Example emulsion-polymerized butadiene/styrene copolymeric rubber (C) compounded product | 58 |

[1] Mill shrinkage was measured as follows:
The open roll was stopped while the compounded product was still banded. After a lapse of 1 minute, a sample measuring 10 cm. x 10 cm. was cut off from the banding compounded sheet along the surface of the roll and the sample was allowed to stand for 3 hours at room temperature. Then, the shrinkage on the surface of the sample in the roll's rotating direction was measured in terms of a percent.

As shown in Table 5, it can be clearly noted that the Example butadiene/styrene copolymeric rubber (A) compounded product is remarkably superior with regard to the mill shrinkage as compared with the Comparative Example emulsion-polymerized butadiene/styrene copolymeric rubber (C) compounded product.

Moreover, it is also clearly noted that the Example butadiene/styrene block copolymeric rubber (B) compounded product in which styrene is completely bonded blockwise is further superior as compared with the Example butadiene/styrene copolymeric rubber (A) compounded product not to mention the Comparative Example emulsion-polymerized butadiene/styrene copolymeric rubber (C) compounded product.

Next, the extrusion properties of these three butadiene/styrene copolymeric rubber compounded products were evaluated and the results as shown in Table 6 were obtained:

TABLE 6

| | Example butadiene/ styrene copolymeric rubber (A) compounded product | Example butadiene/ styrene copolymeric rubber (B) compounded product | Comparative Example emulsion-polymerized butadiene/ styrene copolymeric rubber (C) compounded product |
|---|---|---|---|
| Extrusion rate, cc./min. | 7.0 | 9.5 | 4.5 |
| Die swelling, percent | 15 | 12 | 65 |
| Extrudate appearance [1] | 4 | 5 | 2 |

[1] 5 is the full point.

In carrying out the above test, a Brabender-type extruder was used. The screw dimension was 15 m./m$\phi$ x 90 m./m., the extrusion temperature was 105° C., the screw rotating speed was 50 r.p.m., and a cylindrical extrusion nozzle of 2.0 m./m. diameter was used.

As can be clearly noted from Table 6, the Example butadiene/styrene random copolymeric rubber (A) compounded product is remarkably superior with regards to the extrusion rate, extrudate appearance and die swelling as compared with the Comparative Example emulsion-polymerized butadiene/styrene copolymeric rubber (C) compounded product.

It is also clearly noted that the Example butadiene/styrene block copolymeric rubber (B) compounded product is further superior with respect to the extrusion properties, particularly the extrudate appearance, as compared with other two compounded products.

From the results of mill shrinkage test and the evaluation on the extrusion properties described above, it is clear that the butadiene/styrene copolymeric rubber obtained by polymerization using the lithium based catalyst and having a styrene content of about 65.0% by weight is superior in the processability as compared with the emulsion-polymerized butadiene/styrene copolymeric rubber having the same styrene content.

Moreover, it has been clarified that in the butadiene/styrene copolymeric rubber having a styrene content of 65% by weight, a compounded product having excellent extrusion properties, particularly the extrudate appearance, can be obtained therefrom, if the amount of block syrene in the copolymeric rubber is increased.

Now, the physical properties of the vulcanized rubbers obtained by vulcanizing these three different butadiene/styrene copolymeric rubber compounded products in a hot press at 141° C. for 30 minutes were measured. The results are shown in Table 7:

TABLE 7

|  | Example butadiene/styrene copolymeric rubber (A) compounded product | Example butadiene/styrene copolymeric rubber (B) compounded product | Comparative Example emulsion-polymerized butadiene/styrene copolymeric rubber (C) compounded product |
|---|---|---|---|
| Tensile strength [1], kg./cm.[2] | 220 | 194 | 175 |
| 300% tensile modulus [1], kg./cm.[2] | 220 | -------- | 165 |
| Elongation, percent [1] | 300 | 120 | 100 |
| Tear strength [1], kg./cm | 95 | 122 | 100 |
| Hardness | 99 | 100 | 98 |
| Resilience [2] | 25 | 23 | 15 |
| Brittle temperature,[3] ° C | -17 | -28 | 0 |
| Abrasion index [4] | 125 | 235 | 100 |

[1] Measured according to JIS K-6301.
[2] Measured by Dunlop tripsometer.
[3] Measured by Raman tortion tester.
[4] Measured by Akron abrasion tester. Still load, 2 kg. Slip angle, 15°.

NOTE.—The abrasion resistance of the Comparative Example emulsion-polymerized butadiene/styrene copolymeric rubber (C) compounded product was indexed as 100.

As shown in Table 7, it can be clearly noted that the vulcanized product of the compounded product containing the Example butadiene/styrene random copolymeric rubber (A) obtained by polymerization using the lithium based catalyst and having a styrene content of 65.0% by weight is superior in practically all physical properties, particularly the dynamic property and low temperature characteristic, over the compounded product containing the conventional butadiene/styrene copolymeric rubber (C) having the same styrene content. It can be further noted that the Example butadiene/styrene copolymeric rubber having a styrene content of 65% by weight is far superior particularly in the abrasion resistance as compared with the Comparative Example emulsion-polymerized butadiene/styrene copolymeric rubber in addition to the superiority in the dynamic property and low temperature characteristic.

Example 2

Three samples of butadiene/styrene copolymeric rubbers (A), (B) and (C) having different block styrene contents were obtained according to the same procedures as described in Example 1 in a toluene solution and in the presence of sec-butyl lithium as a catalyst.

The polymerization conditions and the major properties of these butadiene/styrene copolymeric rubbers thus obtained are shown in Table 8:

TABLE 8

|  | Samples | | |
|---|---|---|---|
|  | (A) | (B) | (C) |
| Polymerization conditions: | | | |
| Amount of 1,3-butadiene initially charged | 3 | 7.5 | 35 |
| Amount of styrene initially charged | 65 | 65.0 | 65 |
| Amount of 1,3-butadiene supplemented later | 32 | 27.5 | ------ |
| Amount of sec-butyl lithium | 0.08 | 0.08 | 0.08 |
| Amount of toluene | 500 | 500 | 500 |
| Amount of bound styrene, wt. percent | 65 | 65 | 64.5 |
| Amount of block styrene, wt. percent | ------ | 23.0 | 55.5 |
| Butadiene bonding pattern: | | | |
| Cis-1,4-linkage, percent | 34.2 | 35.1 | 34.8 |
| Trans-1,4-linkage, percent | 54.2 | 53.4 | 53.1 |
| 1,2-linkage, percent | 11.6 | 11.5 | 12.1 |

These three butadiene/styrene copolymeric rubbers thus obtained and, for comparison, an emulsion-polymerized butadiene/styrene copolymeric rubber having a styrene content of 62.5% by weight, more particularly a mixture of a butadiene/styrene copolymeric rubber having a styrene content of 85% by weight and a butadiene/styrene copolymeric rubber having a styrene content of 23.5% by weight, as sample (D), were milled on an open roll according to a recipe shown in Table 9. The milling temperature was 75° C.

TABLE 9

|  | Example | | | Comparative Example |
|---|---|---|---|---|
|  | Sample (A) compounded product, parts by weight | Sample (B) compounded product, parts by weight | Sample (C) compounded product, parts by weight | Sample (D) compounded product, parts by weight |
| Example, sample (A) | 50 | ------ | ------ | ------ |
| Example, sample (B) | ------ | 50 | ------ | ------ |
| Example, sample (C) | ------ | ------ | 50 | ------ |
| Comparative Example, sample (D) | ------ | ------ | ------ | 50 |
| Emulsion-polymerized SBR 1500 [1] | 50 | 50 | 50 | 50 |
| Zinc oxide | 5 | 5 | 5 | 5 |
| Hakuenka [2] | 20 | 20 | 20 | 20 |
| Nipseal VN-3 [3] | 15 | 15 | 15 | 15 |
| Clay | 20 | 20 | 20 | 20 |
| Stearic acid | 2 | 2 | 2 | 2 |
| Aional [4] | 1 | 1 | 1 | 1 |
| Naphthenic process oil [5] | 6 | 6 | 6 | 6 |
| Polyethylene glycol | 2 | 2 | 2 | 2 |
| Vulcanization accelerator DM [6] | 1.5 | 1.5 | 1.5 | 1.5 |
| Vulcanization accelerator D [7] | 0.5 | 0.5 | 0.5 | 0.5 |
| Sulfur | 1.7 | 1.7 | 1.7 | 1.7 |

[1] Emulsion-polymerized butadiene/styrene copolymeric rubber having a styrene content of 23.5% by weight.
[2] A type of resinic acid activated calcium carbonate.
[3] Finely powdered hydrous silicic acid.
[4] 2,6-di-tert-butyl-p-cresol.
[5] V.G.C., 0.8500; specific gravity, 0.8857.
[6] Dibenzothiazyl disulfide.
[7] Diphenyl guanidine.

The compatibility of these four copolymeric rubbers on an open roll was examined and the total time required for mixing all the compounding agents completely were as shown in Table 10.

TABLE 10

| | Mixing time required (min.) |
|---|---|
| Example sample (A) compounded product | 30 |
| Example sample (B) compounded product | 31 |
| Example sample (C) compounded product | 32 |
| Comparative Example sample (D) compounded product | 45 |

As can be clearly noted from the Table 10, the Example butadiene/styrene copolymeric rubber having a styrene content of 65% by weight obtained by the polymerization using sec-butyl lithium based on catalyst has a remarkably superior compatibility irrespective of the amount of block styrene contained therein, as compared with the Comparative Example emulsion-polymerized butadiene/styrene copolymeric rubber (D) having the same styrene content.

Now, these four copolymeric rubber compounded products thus obtained were vulcanized at 140° C. for 60 minutes and the physical properties of the resulting vulcanized products were measured.

The results are shown in Table 11.

TABLE 11

| | Example | | | Comparative Example |
|---|---|---|---|---|
| | Sample (A) compounded product | Sample (B) compounded product | Sample (C) compounded product | Sample (D) compounded product |
| Tensile strength, kg./cm.² | 235 | 221 | 208 | 195 |
| 300% tensile modulus, kg./cm.² | 50 | 52 | 53 | 61 |
| Elongation, percent | 680 | 650 | 620 | 550 |
| Tear strength, kg./cm. | 49 | 48 | 50 | 49 |
| Hardness | 76 | 78 | 82 | 75 |
| Resilience | 45 | 42 | 41 | 30 |
| Abrasion index [1] | 150 | 185 | 235 | 100 |

[1] The abrasion resistance of the Comparative Example emulsion-polymerized butadiene/styrene copolymeric rubber was indexed as 100. The test conditions were the same as described in Example 1, Table 7.

As can be noted from Table 11, the Example butadiene/styrene copolymeric rubbers (A), (B) and (C) are superior with respects to practically all physical properties, particularly the dynamic property and abrasion index, over the Comparative butadiene/styrene copolymeric rubber (D).

It can be further noted from the comparison among the Example butadiene/styrene copolymeric rubbers (A), (B) and (C) that as the content of block styrene in the copolymeric rubber is increased, the abrasion resistance is further increased accordingly.

Now, these four copolymeric rubber compounded products were heat-moulded in a shoe-sole mould at 140° C. for 60 minutes and the resulting vulcanized shoe-soles were attached to the shoes which were actually worn to evaluate the abrasion resistance. The results are shown in Table 12:

TABLE 12

| | Abrasion resistance [1] |
|---|---|
| Example sample (A) compounded product | 140 |
| Example sample (B) compounded product | 155 |
| Example sample (C) compounded product | 190 |
| Comparative Example sample (D) compounded product | 100 |

[1] The actually-worn abrasion resistance of the Comparative Example sample (D) compounded product was indexed as 100.

As can be seen from Table 12, the actually-worn abrasion resistance of any of those three Example butadiene/styrene copolymeric rubbers are remarkably superior as compared with the Comparative Example butadiene/styrene copolymeric rubber.

It is also noted from the comparison among the Example butadiene/styrene copolymeric rubbers (A), (B) and (C) that as the content of block styrene is increased in the copolymeric rubber, the abrasion resistance is further increased accordingly.

Example 3

A butadiene/styrene block copolymeric rubber having a styrene content of 84.5% by weight was obtained by polymerizing 1,3-butadiene in toluene containing a small amount of tetrahydrofurane in the presence of n-butyl lithium and additionally polymerizing styrene after the complete polymerization of 1,3-butadiene.

The polymerization conditions and the major properties of the block copolymeric rubber (A) thus obtained are shown in Table 13.

TABLE 13

| | |
|---|---|
| Polymerization conditions: | |
| Amount of 1,3-butadiene | 15 |
| Amount of styrene | 85 |
| Amount of tetrahydrofurane | 0.84 |
| Amount of n-butyl lithium | 0.07 |
| Amount of toluene | 600 |
| Adount of bound styrene (wt. percent) | 85 |
| Amount of block styrene (wt. percent) | 84.5 |
| Butadiene bonding pattern: | |
| Cis-1,4-linkage (percent) | 27.5 |
| Trans-1,4-linkage (percent) | 47.5 |
| 1,2-linkage (percent) | 28.0 |

The butadiene/styrene block copolymer rubber (A), a butadiene/styrene copolymeric rubber obtained by the polymerization using the lithium based catalyst and having a styrene content of 25.0% by weight and a block styrene content of 17.5% by weight and further having a butadiene bonding pattern including 34.5% of cis-1,4-linkage and 55.0% of 1,2-linkage, known as Solprene 1205 (Trade name), as sample (B), and an emulsion-polymerized butadiene/styrene copolymeric rubber having a styrene content of 85.0%, as sample (C), were compounded according to a recipe shown in Table 14 using a B-type Banbury mixer. The mixing conditions were the same as given in Example 1.

The Table 16 clearly indicates that in the extrusion properties as well, the effect in improving the process-

TABLE 14

| | Compound products | | | |
|---|---|---|---|---|
| | Example (A) | Comparative Example (B) | Comparative Example (C) | Comparative Example (D) |
| Low-cis ploybutadiene rubber [1] | 80 | 80 | 80 | 100 |
| Example sample (A) | 20 | | | |
| Comparative sample (B) | | 20 | | |
| Comparative sample (C) | | | 20 | |
| F.E.F. grade carbon black | 40 | 40 | 40 | 40 |
| Aromatic process oil [2] | 7.5 | 7.5 | 7.5 | 7.5 |
| Zinc oxide | 3.0 | 3.0 | 3.0 | 3.0 |
| Stearic acid | 2.0 | 2.0 | 2.0 | 2.0 |
| Antioxidant B [3] | 1.0 | 1.0 | 1.0 | 1.0 |
| Antioxidant AW [4] | 1.5 | 1.5 | 1.5 | 1.5 |
| Sulfur | 1.8 | 1.8 | 1.8 | 1.8 |
| Vulcanization accelerator CZ | 1.10 | 1.10 | 1.10 | 1.10 |

[1] Polybutadiene rubber polymerized by using n-butyl lithium having 34.5% of cis-1,4-linkage, 53.5% of trans-1,4-linkage and 12.0% of 1,2-linkage. Mooney viscosity, 55; Trade name, Diene 55.
[2] V.G.C., 0.9850; specific gravity, 0.9950.
[3] Reaction product in a reaction of diphenylamine with acetone at a high temperature.
[4] 6-ethoxy-1,2-dihydro-2,2,4-trimethylquinoline.

The Mooney viscosities and mill shrinkages of those four unvulcanized compounded products thus obtained were measured with the results shown in Table 15. The measuring conditions were the same as in Example 1.

TABLE 15

| | Mooney viscosity, $ML_{1+4}$, 100° C. | Mill shrinkage, percent |
|---|---|---|
| Compounded product, Example (A) | 45 | 20.0 |
| Compounded product, Comparative Example (B) | 57 | 29.0 |
| Compounded product, Comparative Example (C) | 55 | 54.0 |
| Compounded product, Comparative Example (D) | 58 | 35.0 |

As can be noted from Table 15 shown above, compounded product, Example (A) consisting of 20% by weight of the low-cis polybutadiene and 80% by weight of the butadiene/styrene block copolymeric rubber (A) having a styrene content of 84.5% by weight obtained by the polymerization using the lithium based catalyst shows lower Mooney viscosity and mill shrinkage than those of the compounded products containing other Comparative Example butadiene/styrene copolymeric rubbers, i.e. the butadiene/styrene block copolymeric rubber (B) having a styrene content of 25.0% by weight obtained by the polymerization using the lithium based catalyst and the emulsion-polymerized butadiene/styrene copolymeric rubber having a styrene content of 85.0% by weight. It can be clearly noted that the addition of a small amount of butadiene/styrene copolymeric rubber having a styrene content of 60–95% by weight obtained by the polymerization using the lithium based catalyst to the polybutadiene rubber has a remarkable effect in improving the processability of polybutadiene rubber as compared with the addition of the emulsion-polymerized butadiene/styrene copolymeric rubber or the butadiene/styrene copolymeric rubber having a styrene content outside the present invention.

Next, the extrusion properties of these four unvulcanized compounded products were evaluated by using a Brabender-type extruder. The results are shown in Table 16.

ability of the low-cis polybutadiene rubber brought about by the addition of a small amount of the butadiene/styrene block copolymeric rubber (A) of this invention having a styrene content of 84.5% by weight obtained by the polymerization using the lithium based catalyst is remarkably greater as compared with that of the butadiene/styrene block copolymeric rubber (B) having a lower styrene content than set forth in the present invention or the emulsion-polymerized butadiene/styrene copolymeric rubber (C).

Example 4

Two samples of butadiene/styrene copolymeric rubbers (A) and (B) having different contents of block styrene were obtained according to the same procedures as in Example 1 in the presence of n-butyl lithium as a catalyst in toluene as a solvent.

The polymerization conditions and the major properties of the copolymeric rubbers thus obtained are shown in Table 17.

A small amount of divinylbenzene was added to these butadiene/styrene copolymeric rubbers (A) and (B) as a cross-linking agent in order to prevent the excessive tackiness of these rubbers to the roll during the milling in an open roll.

TABLE 17

| | Sample (A) | Sample (B) |
|---|---|---|
| Polymerization conditions: | | |
| Amount of 1,3-butadiene initially charged | 35 | 3 |
| Amount of styrene initially charged | 65 | 65 |
| Amount of divinylbenzene initially charged | 0.04 | 0.04 |
| Amount of 1,3-butadiene supplemented later | | 32 |
| Amount of n-butyl lithium | 0.10 | 0.10 |
| Amount of toluene | 600 | 600 |
| Amount of bound styrene, wt. percent | 65 | 64 |
| Amount of block styrene, wt. percent | 52.5 | 0.9 |
| Butadiene bonding pattern: | | |
| Cis-1,4-linkage, percent | 35.0 | 34.7 |
| Trans-1,4-linkage, percent | 54.2 | 54.1 |
| 1,2-linkage, percent | 10.8 | 11.2 |

Now, these two butadiene/styrene copolymeric rubbers (A) and (B), and, for comparison, an emulsion-polymerized butadiene/styrene copolymeric rubber (C) having

TABLE 16

| | Compounded products | | | |
|---|---|---|---|---|
| | Example (A) | Comparative Example (B) | Comparative Example (C) | Comparative Example (D) |
| Extrusion rate, cc./min | 8.5 | 7.5 | 8.0 | 4.5 |
| Die swelling, percent | 15 | 25 | 58 | 40 |
| Extrudate appearance | 5 | 3 | 2 | 2 |

NOTE.—The extrusion conditions and the basis of evaluation of the extrudate appearance were the same as in Example 1.

a styrene content of 60.0% by weight were compounded on an open roll according to a recipe shown in Table 18.

rubbers (A) and (B) having styrene content of 65% by weight obtained by the polymerization using the lithium

TABLE 18.—RECIPE

|  | Example | | Comparative Example |
|---|---|---|---|
|  | Sample (A) compounded product | Sample (B) compounded product | Sample (C) compounded product |
| Example sample (A) | 50 | | |
| Example sample (B) | | 50 | |
| Comparative Example sample (C) | | | 50 |
| Natural rubber, RSS #3 | 10 | 10 | 10 |
| Emulsion-polymerized SBR 1502 [1] | 40 | 40 | 40 |
| Sulfur | 2.5 | 2.5 | 2.5 |
| Zinc oxide | 5 | 5 | 5 |
| Stearic acid | 2 | 2 | 2 |
| Foaming agent, DPT [2] | 4 | 4 | 16 |
| Foaming assistant derived from urea [3] | 5 | 5 | [6 |
| Coumarone resin | 5 | 5 | 5 |
| Naphthenic process oil [4] | 10 | 10 | 10 |
| Hard clay | 30 | 30 | 30 |
| Carmos [5] | 40 | 40 | 40 |
| Hakuenka O | 30 | 30 | 30 |
| Light calcium carbonate | 30 | 30 | 30 |

[1] Non-contaminating emulsion-polymerized butadiene/styrene polymeric rubber having a styrene content of 23.5% by weight.
[2] Dinitrosopentamethylenetetramine.
[3] Selton A, Trade name. Urea and derivatives thereof.
[4] V.G.C., 0.876; specific gravity, 0.9085.
[5] Calcium carbonate treated by lignin.

These three compounds thus obtained were then vulcanized according to the procedures described in Table 19 and there were obtained vulcanized sponge foamed products.

TABLE 19

The unvulcanized compound was put into a mould measuring 140 mm. x 70 mm. x 12 mm. and a primary vulcanization was carried out at 135° C. for 11 minutes and the resulting primary vulcanized product was then transferred to another mould measuring 224 mm. x 112 mm. x 26 mm. and a secondary vulcanization was carried out at 155° C. for 11 minutes. Although the foaming operation is completed in the secondary vulcanization, the interior of the foamed bubbles are still preserving pressure under this condition. Thus, if the foamed product is taken out into open air as such, the foamed product shrinks as the internal pressure escapes into open air.

Thus, in order to minimize this shrinking phenomenon, the secondary vulcanized product is further put into a thermostat maintained at 30° C. in an open state for 22 hours to relax the stress. The last operation is called a ternary vulcanization.

The physical properties of the sponge foamed product thus obtained are shown in Table 20.

based catalyst according to this invention are advantageous from the standpoint of compounding cost in that they require smaller amounts of foaming agent and foaming assistant in obtaining a given volume ratio of the foamed product to the unvulcanized compounded product as compared with the compounded product of the Comparative Example emulsion-polymerized butadiene/styrene copolymeric rubber (C).

It can also be noted that the compounded products of the Example butadiene/styrene copolymeric rubbers (A) and (B) are superior with respect to every physical property over the compounded product of the Comparative Example emulsion-polymerizated butadiene/styrene copolymeric rubber (C), and the superiority of compounded products of the Example samples (A) and (B), particularly in the resilience and compulsory shrinkage clearly indicates how the butadiene/styrene copolymeric rubber having a styrene content of 65% by weight obtained by polymerization using the lithium based catalyst is suited for the sponge foamed rubber product.

Next, three sponge foamed products were prepared from three different compounded products obtained according to the recipe of Table 18 and these foamed products were made into rubber soles of shoes which were

TABLE 20

|  | Example | | Comparative Example |
|---|---|---|---|
|  | Sample (A) compounded product | Sample (B) compounded product | Sample (C) compounded product |
| Mooney viscosity, ML$^{1+4}$, 100° C | 30 | 32 | 35 |
| Mooney scorch time, min | 15 | 15 | 14 |
| Volume ratio [1]: | | | |
| Primary vulcanization | 2.1 | 2.1 | 2 |
| Secondary vulcanization | 5.7 | 5.5 | 5.5 |
| Hardness, Ascar C-type | 75 | 65 | 62 |
| Tensile strength, kg./cm.$^2$ | 20 | 25 | 15 |
| Elongation, percent | 175 | 160 | 140 |
| Resilience, percent | 43 | 45 | 30 |
| Permanent compression set, percent [2] | 25 | 29 | 34 |
| Compulsory shrinkage, percent [3] | 2.4 | 2.4 | 2.9 |
| Specific gravity | 0.20 | 0.20 | 0.20 |

[1] The volume ratio of foamed product to unvulcanized compound indicated in times.
[2] Measured according to JIS K-6301.
[3] Shrinkage during the ternary vulcanization.

As can be seen from Table 20, it is noted that the compounded products of the butadiene/styrene copolymeric actually worn to measure the abrasion resistances. The results are shown in Table 21.

TABLE 21

Abrasion index [1]

| | |
|---|---|
| Example butadiene/styrene copolymeric rubber (A) compounded product | 170 |
| Example butadiene/styrene copolymeric rubber (B) compounded product | 130 |
| Comparative Example emulsion-polymerized butadiene/styrene copolymeric rubber (C) compounded product | 100 |

[1] The degree of abrasion after actual wearing for 5 months was measured. The abrasion resistance of the Comparative Example emulsion-polymerized butadiene/styrene copolymeric rubber (C) compounded product was indexed as 100.

The Table 21 clearly shows that the compounded product of the Example butadiene/styrene copolymeric rubber (A) having a styrene content of 65% by weight shows remarkably higher abrasion resistance as compared with the compounded product of the Comparative Example emulsion-polymerized butadiene/styrene copolymer rubber (C).

Moreover, the compounded product of the Example butadiene/styrene copolymeric rubber (A) having a block styrene content of 52.5% by weight shows a further improvement in the abrasion resistance over the Example butadiene/styrene copolymeric rubber (B) containing no block styrene.

Example 5

To a 15% by weight toluene solution containing 19.5 parts by weight of 1,3-butadiene and 32.5 parts by weight of styrene was added 0.065 part by weight of sec-butyl lithium and the polymerization was carried out at 70° C. for 3 hours. After the 1,3-butadiene and styrene were completely polymerized, there was added 0.105 part by weight of 1,2-dibromoethane to couple the terminals of the active butadiene/styrene copolymer with each other. It was confirmed that the coupling reaction proceeded substantially quantitatively by measuring the intrinsic viscosity of the copolymer before and after the addition of the dibromoethane and calculating the molecular weight.

Subsequently, to the resulting solution of the copolymeric rubber was added 0.50 part by weight of 2,6-ditert-butyl-p-cresol per 100 parts by weight of the copolymeric rubber and, after being mixed uniformly, the solvent was removed by drying to give a butadiene/styrene copolymeric rubber (A) having three blocks.

Separately, to a 15% by weight toluene solution containing 35.0 parts by weight of 1,3-butadiene and 65.0 parts by weight of styrene was added 0.056 part by weight of sec-butyl lithium and the polymerization was carried out at 70° C. for 3 hours.

After the 1,3-butadiene and styrene were completely polymerized, there was added 0.50 part by weight of 2,6-di-tert-butyl-p-cresol and the solvent was removed by drying to give a Example butadiene/styrene copolymeric rubber (B) having two blocks.

For comparison, a butadiene/styrene random copolymeric rubber (C) having a styrene content of 65.0% by weight was obtained according to the procedures as described in Example 1. The polymerization conditions are shown in Table 22.

TABLE 22

| | Parts by wt. |
|---|---|
| Amount of 1,3-butadiene initially charged | 3.5 |
| Amount of styrene initially charged | 65 |
| Amount of 1,3-butadiene supplemented later | 31.5 |
| Amount of sec-butyl lithium | 0.053 |
| Amount of n-hexane | 400 |
| Polymerization temperature (° C.) | 65 |
| Polymerization time (hrs.) | 8 |

The major properties of the resulting three butadiene/styrene copolymeric rubbers (A), (B) and (C) as actually measured are shown in Table 23.

TABLE 23

| | Example block copolymeric rubber (A) | Example block copolymeric rubber (B) | Comparative Example random copolymeric rubber (C) |
|---|---|---|---|
| Content of bound styrene, wt. percent | 64.5 | 65.0 | 64.8 |
| Content of block styrene, wt. percent | 58.0 | 58.5 | 1.0 |
| Butadiene bonding pattern: | | | |
| Cis-1,4-linkage | 38.5 | 37.5 | 37.0 |
| Trans-1,4-linkage | 51.5 | 50.5 | 51.0 |
| 1,2-linkage | 10.5 | 12.5 | 12.0 |
| Mooney viscosity, ML$_{1+4}$, 100° C | 65 | 70 | 68 |

Next, the resulting three copolymeric rubbers were compounded according to a recipe shown in Table 24 using a B-type Bunbury mixer, respectively.

TABLE 24

Recipe

| | Part(s) by wt. |
|---|---|
| Example or Comparative Example copolymeric rubber | 50 |
| Emulsion-polymerized butadiene/styrene copolymeric rubber JSR 1500 | 50 |
| Naphthenic process oil [1] | 5 |
| Hakuenka O | 10 |
| Finely powdered hydrous silicic acid | 20 |
| Clay | 30 |
| Stearic acid | 2 |
| Polyethylene glycol [2] | 2 |
| Antioxidant 2246 [3] | 1 |
| Vulcanization accelerator DM [4] | 1.5 |
| Vulcanization accelerator D [5] | 0.5 |
| Sulfur | 1.7 |

[1] V.G.C.—0.8750, Specific gravity—0.8990.
[2] Average molecular weight—200.
[3] Dibenzothiazyl disulfide, trade name.
[4] Dibenzothiazyl disulfide, trade name.
[5] Diphenylguanidine, trade name.

Now, the resulting compounded products of these three polymeric rubbers were heated in a hot-press at 140° C. for 60 minutes, respectively, to give the corresponding vulcanized products having the physical properties as shown in Table 25.

TABLE 25

| | Example copolymeric rubber (A) compounded product | Example copolymeric rubber (B) compounded product | Comparative Example copolymeric rubber (C) compounded product |
|---|---|---|---|
| Tensile strength, kg./cm.² | 185 | 165 | 150 |
| 300% tensile modulus, kg./cm.² | 95 | 100 | 61 |
| Elongation, percent | 575 | 550 | 525 |
| Tear strength, kg./cm.² | 55 | 50 | 35 |
| Hardness | 98 | 96 | 60 |
| Abrasion resistance [1] | 100 | 85 | 69 |
| Resilience, percent | 40 | 35 | 37.5 |
| Permanent compression set, percent | 55 | 72 | 45 |

[1] The abrasion resistance of the compounded product of the Example copolymeric rubber (A) was indexed as 100. The measuring conditions were the same as in Table 10.

As clearly noted from the results shown in Table 25, the compounded product of the 3-block copolymeric rubber (A) according to this invention is superior in the abrasion resistance and permanent compression set over the compounded product of the Example 2-block copolymeric rubber (B).

It can be also be noted that the compounded product of the Comparative Example random copolymeric rubber (C) shows poor physical properties in all respects except for the somewhat higher tensile strength, as compared with the compounded product of the 3-block copolymeric rubber (A) of this invention, showing that it is unsuitable for rubber sole due to the extremely low hardness.

Next, the compounded product of these three copolymeric rubbers were compressed in a mould having a shape of shoe-sole (heel-portion) and vulcanized at 145° C. for 60 minutes.

The resulting vulcanized products of the compounded products of these copolymeric rubbers were attached respectively to the shoes which were actually worn. The results are shown in Table 26.

TABLE 26

| | Example copolymeric rubber (A) compounded product | Example copolymeric rubber (B) compounded product | Comparative Example copolymeric rubber (C) compounded product |
|---|---|---|---|
| Abrasion resistance ([1]) | 100 | 85 | 55 |
| Surface condition ([2]) | ([3]) | ([4]) | ([3]) |

[1] The abrasion resistance of the compound product of the Example copolymeric rubber (A) was indexed as 100.
[2] The appearance of the sole surfaces were examined after being worn for about 2 months.
[3] Good.
[4] Slightly uneven and fatigue observed.

As can be clearly noted from the results shown in Table 26, the compounded product of the Example 3-block copolymeric rubber (A) according to this invention shows a remarkably superior abrasion resistance and surface condition as compared particularly with the compounded product of the Comparative Example copolymeric rubber (c), and this is a good example to show that the 3-block copolymeric rubber is most suitable for rubber shoes soles when said 3-block copolymeric rubber is used alone.

What is claimed is:

1. A rubber composition comprising 100 parts by weight of a rubber material comprising at least 5% by weight of a butadiene/styrene copolymeric rubber having a styrene content of 60–95% by weight and having a butadiene bonding pattern including 20–50% of cis-1, 4-linkage and less than 40% of 1,2-linkage, which is obtained by polymerization using a lithium based catalyst, and a member selected from the group consisting of natural rubber, emulsion-polymerized butadiene/styrene copolymeric rubber, emulsion-polymerized polybutadiene rubber, solution polymerized polybutadiene rubber, solution-polymerized butadiene/styrene copolymeric rubber, polyisoprene rubber, emulsion-polymerized butadiene/acrylonitrile copolymeric rubber, polychloroprene rubber and ethylene/propylene copolymeric rubber, said butadiene/styrene copolymeric rubber having a styrene content of 60–95% by weight being a block copolymer having a structure of the formula,

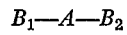

$$B_1-A-B_2$$

wherein $B_1$ and $B_2$ each represent a member selected from the group consisting of polybutadiene block and a random copolymeric block consisting of 1,3-butadiene and styrene wherein the styrene content is less than 50%, and A represents a polystyrene block, the composition ratio of said $B_1$ and said $B_2$ blocks being respectively 5–90% by weight, and the composition ratio of said A block being 5–75% by weight, based on the weight of said block copolymer, 2–100 parts by weight of a process oil and 10–400 parts by weight of a filler.

2. A rubber composition according to claim 1 wherein said process oil has Viscosity Gravity Constant from 0.790 to 1.00 and is a member selected from the group consisting of a paraffinic oil comprising straight chain saturated hydrocarbons, a naphthenic oil comprising saturated cyclic hydrocarbons and an aromatic oil comprising cyclic hydrocarbons.

3. A rubber composition according to claim 1 wherein said filler is a member selected from the group consisting or carbon black, anhydrous silicic acid, hydrous silicic acid, calcuim carbonate, calcium silicate, calcium carbonate coated with fatty acid, magnesium carbonate, magnesium oxide, zinc oxide, titanium oxide, clay, alumina and talc.

References Cited

UNITED STATES PATENTS

| 2,638,457 | 5/1953 | Gates | 260—17.4 |
| 2,638,462 | 5/1953 | Borders | 260—892 |
| 2,835,645 | 5/1958 | D'Ianni et al. | 260—83.7 |
| 2,900,357 | 8/1959 | Ayers et al. | 260—33.6 |
| 3,094,512 | 6/1963 | Short | 260—83.7 |
| 3,231,635 | 1/1966 | Holden et al. | 260—880 |
| 3,264,237 | 8/1966 | Sarbach et al. | 260—23.7 |
| 3,287,333 | 11/1966 | Zelinski | 260—83.7 |
| 3,287,333 | 11/1966 | Zelinski | 260—83.7 |
| 3,352,944 | 11/1967 | Wheat | 260—876 |

OTHER REFERENCES

Winspear, "The Vanderbilt Rubber Handbook," 1958, p. 482.

DONALD E. CZAJA, Primary Examiner

R. A. WHITE, Assistant Examiner

U.S. Cl. X.R.

260—23.7, 33.6, 41.5, 876, 880

UNITED STATES PATENT OFFICE
CERTIFICATE OF CORRECTION

Patent No. 3,526,606  Dated September 1, 1970

Inventor(s) SABURO MINEKAWA et al

It is certified that error appears in the above-identified patent and that said Letters Patent are hereby corrected as shown below:

Column 7, line 52 - after "a delete "food" and replace with "good", as indicated in specification at page 16, line 30.

Column 14, line 34, Table 6 - in third column, after "emulsion" delete "-2" as indicated in application at page 34, line 1.

Column 15, line 16, Table 7 - under second column, delete "194" and replace with "195", as indicated in specification at page 36, line 8.

Column 21, Table 18 - between "Sulfur" and "Zinc oxide", insert the following "Vulcanization accelerator DM   1.2   1.2   1.2", as indicated in specification at page 48, lines 18-19.

Column 23, line 72 - after "by" delete "wfeight" and replace with "weight", as indicated in specification at page 53, line 6.

Signed and sealed this 23rd day of November 1971.

(SEAL)
Attest:

EDWARD M. FLETCHER, JR.
Attesting Officer

ROBERT GOTTSCHALK
Acting Commissioner of Patents